United States Patent [19]

Hinkel et al.

[11] 4,415,634
[45] Nov. 15, 1983

[54] MAGNETIC DISK SUBSTRATE WITH A CORE OF SYNTHETIC MATERIAL

[75] Inventors: Holger Hinkel, Boeblingen; Ulrich Kuenzel, Kusterdingen; Erhard Max, Sindelfingen; Jochen Schneider, Gaertringen-Rohrau, all of Fed. Rep. of Germany

[73] Assignee: International Business Machines Corporation, Armonk, N.Y.

[21] Appl. No.: 381,246

[22] Filed: May 24, 1982

[30] Foreign Application Priority Data

Jul. 23, 1981 [EP] European Pat. Off. ........ 81105823.9

[51] Int. Cl.³ .............................................. G11B 5/14
[52] U.S. Cl. .................................. 428/579; 428/612; 428/674; 428/928; 427/129; 427/132
[58] Field of Search .................. 428/64, 65, 626, 677, 428/678, 336, 694, 928, 612, 674; 427/132, 129, 127

[56] References Cited

U.S. PATENT DOCUMENTS 3,761,333  9/1973  Kleinbeck et al. .................... 156/64
4,101,402  7/1978  Vossen, Jr. et al. ................. 428/626

Primary Examiner—Norman Morgenstern
Assistant Examiner—Kenneth Jaconetty
Attorney, Agent, or Firm—Walter J. Madden, Jr.

[57] ABSTRACT

A substrate for a magnetic recording disk employs an annular core of synthetic material having thin metal foils bonded to opposite faces, the metal foils serving to receive a magnetic recording material to form a magnetic recording structure. The inner surfaces of foils which are bonded to the core faces have applied thereto a thin, soft, deformable layer such as copper to prevent irregularities in the core faces from affecting the outer surfaces of the metal foils.

3 Claims, 2 Drawing Figures

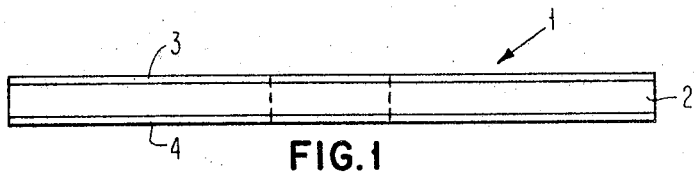
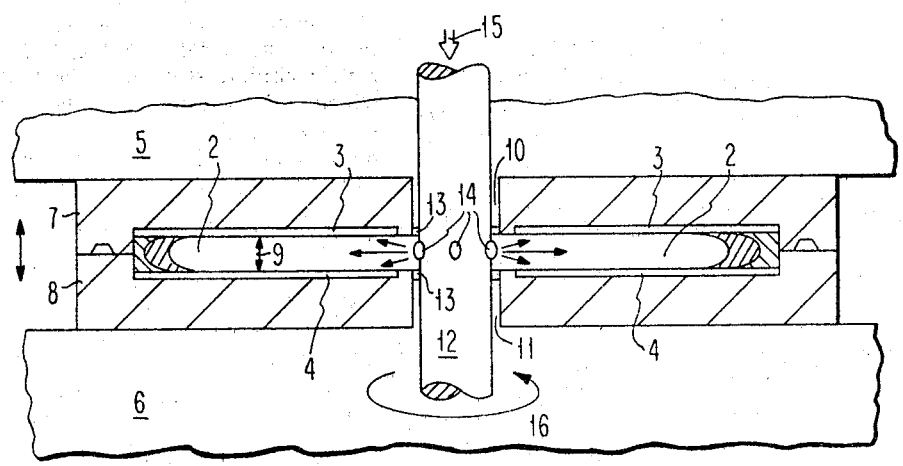

MAGNETIC DISK SUBSTRATE WITH A CORE OF SYNTHETIC MATERIAL

BACKGROUND OF THE INVENTION

1. Field of the Invention

The invention relates to a magnetic disk substrate with a core of synthetic material.

2. Description of the Prior Art

U.S. Pat. No. 3,761,333—Kleinbeck et al shows a magnetic recording disk with a core made of synthetic material. According to this arrangement, a magnetic disk is made by placing a magnetizable foil into one half of a mold, and then placing a prefabricated core of synthetic material on the foil. Into the other half of the mold a second magnetizable foil is placed. Under the influence of heat and pressure, the two magnetizable foils are molded with the core of synthetic material. This patent also teaches the production by the above-described method of pure magnetic disk substrates consisting of synthetic material. The magnetic layer is applied in a subsequent process step onto such substrates.

One problem in the production of magnetic disks and magnetic disk substrates, in accordance with this prior art method is that when the finished magnetic disk or disk substrate is removed from the mold, parts of the disk or substrate adhere to the mold. This causes surface deformations or defects in the magnetic layer. A particularly serious problem is that from a specific temperature upward, the so-called blocking point, synthetic foils and materials are blocking or adhering, even if the pressure applied is very low. This can be countered with anti-blocking agents, but their effect is to increase the surface roughness in order to reduce the mold-contacting surface. Although the introduction of separating agents between parts of the mold and the foils or the synthetic material core has an improving effect, tests have shown that it is far too small to satisfy modern-day demands regarding the peak-to-valley height of the surface, and consequently to avoid the absence of bits as indicated by missing magnetic material. The necessary peak-to-valley height cannot be achieved by polishing the magnetic layer, because subsequent processing is impossible. However, if magnetizable foils are used, they have to be available in the small thickness of approximately 0.05–0.8 $\mu$m which is impossible in a practical application, for such thin foils are neither available nor producible.

SUMMARY OF THE INVENTION

The present invention solves the problem of providing a magnetic disk substrate which has no surface defects, and which basically permits subsequent surface processing.

The advantages achieved by the present invention are that the planarity of the magnetic disk substrate is determined by the planarity of the tool used for molding the core of synthetic material with the metal foils, and that the hardness of the surface and its peak-to-valley height can be determined by the metal foil characteristics. With respect to the peak-to-valley height of the surface, there can, if necessary, be a subsequent treatment of the metal foil applied onto the core following well-known methods.

There can be additional advantages with the present invention, particularly in accordance with an embodiment where the core of synthetic material contains fibers. If hard steel foils are used as metal foils, the fiber structure can penetrate up to the metal foil surface during molding. According to this invention, this can be avoided by introducing a plastically deformable soft layer, preferably copper, between the core and metal foil. For example, the metal foil designed as a steel foil can be galvanically copper-plated on one side. To increase adhesion between the core of synthetic material and the metal foil, the surface of the copper layer can be roughened during the galvanic process.

BRIEF DESCRIPTION OF THE DRAWINGS

The invention will be described in detail with reference to the drawing which illustrates one specific embodiment.

FIG. 1 is a schematic sectional view of the structure of a magnetic disk substrate designed in accordance with the invention; and FIG. 2 schematically illustrates a tool for making magnetic disk substrates in accordance with the invention.

DESCRIPTION OF THE PREFERRED EMBODIMENT

FIG. 1 is a schematic representation of a magnetic disk substrate in accordance with the invention. It consists of a core 2 of synthetic material which on one or both sides is covered with metal foils 3 and 4. Metal foils 3 and 4 can be between 10 $\mu$m and 300 $\mu$m thick, and they have the micro-hardness required for the surface of magnetic disk substrate 1, and the necessary very low peak-to-valley height of approximately 0.05 to 0.1 $\mu$m. Substrates made of synthetic material alone do not have the necessary micro-hardness of the surface which is reached by the invention with metal foils 3 and 4 preferably made of steel. These foils also represent the basis for establishing the required surface quality of metal foils 3 and 4 through polishing, either before or after the production of the magnetic disk substrate. It is possible to increase the surface quality through polishing after the molding of core 2 and foils 3 and 4.

Magnetic disk substrate 1 can be made in either of two ways. In a first method, an already completed synthetic material core 2 is covered on both sides with metal foils 3 and 4, and this structure is subsequently placed into a mold, as depicted in FIG. 2, heated and exposed to pressure. After the curing of the synthetic material, metal foils 3 and 4 are bonded with core 2.

Another method of production is represented in detail in FIG. 2. FIG. 2 shows a mold mask 5 and 6 into which a form consisting of two halves 7 and 8 can be introduced. Upper metal foil 3 is placed into upper half 7, and foil 4 is placed in lower half 8. Metal foils 3 and 4 are of an annular shape, i.e. both have a punched-out round hole in the middle. The metal foils are spaced from each other within assembled halves 7 and 8 by a specific space marked with double arrow 9. In the middle, both halves 7 and 8 have a recess 10 or 11 through which a tube 12 extends. Tube 12 is sealed against space 9 and halves 7 and 8 by means of seals 13. In the middle between halves 7 and 8 in space 9, the tube has openings 14 for the exit of synthetic material supplied under pressure from above in accordance with arrow 15, and filling the space between halves 7 and 8 and metal foils 3 and 4. Tube 12 can be rotated in accordance with arrow 16.

In the production of a magnetic disk substrate 1 out of a fiber-reinforced core 2 in accordance with the present invention, the fiber structures can penetrate to steel foils 3 and 4 if very high pressures are used, i.e. there is a faint image of the fibers which would appear on the surface of the magnetic disk substrate. In order to avoid this, a relatively soft, deformable layer is inserted between core 2 and metal foils 3 and 4, which reduces the tension and receives the fiber structures. This layer is not represented in detail in the figures. With a fiber thickness of 5 μm, this layer should be at least 5 μm thick also. The upper limit of this layer thickness is approximately 100 μm. The layer is preferably made of copper, with metal foils 3 and 4 which may consist of steel being galvanically copper-plated on one side. To improve adhesion between core 2 and metal foils 3 and 4, the surface of the copper layer can be roughly electroplated.

Onto magnetic disk substrate 1, made in accordance with the invention, whose planarity is determined by the planarity of the tool, or of mold 7, 8, and whose surface quality regarding micro-hardness and peak-to-valley height is determined by metal foils 3, 4, the magnetic layer is applied in a known manner. This can be effected in accordance with various known techniques for applying a magnetic layer, as for example, spin coating, vapor deposition, or sputtering.

We claim:

1. A magnetic recording disk comprising
   an annular core of synthetic material,
   at least one thin metal foil bonded to a face of said core, the outer surface of said foil forming a magnetic recording media-receiving surface,
   the inner surface of said foil which is bonded to said core being provided with a relatively soft layer of copper,
   said copper layer being an electro-plated layer applied to said metal foil before said foil is bonded to said core, and a magnetic recording layer on said recording media-receiving surface.

2. A magnetic disk substrate as claimed in claim 1 in which said electroplated copper layer has a roughened surface to improve the adhesion between said synthetic core and said metal foil.

3. A magnetic disk substrate as claimed in claim 2 in which two metal foils are bonded to opposite faces of said core, the inner surfaces of both of said foils having said electroplated copper layer.

* * * * *